(12) United States Patent
Oh

(10) Patent No.: US 12,286,127 B2
(45) Date of Patent: *Apr. 29, 2025

(54) METHOD FOR DETERMINING DRIVING STATUS OF VEHICLE

(71) Applicants: Hyundai Motor Company, Seoul (KR); Kia Corporation, Seoul (KR)

(72) Inventor: Ji Won Oh, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 239 days.

This patent is subject to a terminal disclaimer.

(21) Appl. No.: 17/831,104

(22) Filed: Jun. 2, 2022

(65) Prior Publication Data

US 2023/0077116 A1 Mar. 9, 2023

(30) Foreign Application Priority Data

Sep. 9, 2021 (KR) .................. 10-2021-0120152

(51) Int. Cl.
*B60W 30/18* (2012.01)
*B60W 40/076* (2012.01)
(Continued)

(52) U.S. Cl.
CPC ...... *B60W 50/0205* (2013.01); *B60W 40/076* (2013.01); *B60W 40/107* (2013.01);
(Continued)

(58) Field of Classification Search
CPC .......... B60W 50/0205; B60W 40/076; B60W 40/107; B60W 2552/35; B60W 2552/15;
(Continued)

(56) References Cited

U.S. PATENT DOCUMENTS 5,623,189 A * 4/1997 Hemmer .............. B65H 23/198
318/432
5,929,587 A * 7/1999 Kang .................. B01D 69/125
318/632

(Continued)

OTHER PUBLICATIONS

Muhammad et al., Specifications and strategies for state estimation of vehicle and platoon, Aug. 2011, KTH Electrical Engineering, pp. 1-116 (pdf).*

*Primary Examiner* — Manglesh M Patel
(74) *Attorney, Agent, or Firm* — Morgan, Lewis & Bockius LLP

(57) ABSTRACT

A method for determining a driving state of a vehicle includes determining a torque command of a vehicle drive apparatus based on vehicle driving information collected during driving of the vehicle, determining an acceleration error defined as a difference between a reference longitudinal acceleration of the vehicle interlocked with the torque command and a measured longitudinal acceleration of the vehicle, determining an acceleration disturbance rate defined as a difference between an actual rotational acceleration of the vehicle drive and a reference drive apparatus rotational acceleration interlocked with the torque command based on the determined torque command, integrating the determined acceleration disturbance rate to determine the acceleration disturbance, and determining a current vehicle driving state of the vehicle based on the determined acceleration error, the determined acceleration disturbance rate and the acceleration disturbance.

20 Claims, 5 Drawing Sheets

(51) Int. Cl.
*B60W 40/107* (2012.01)
*B60W 50/02* (2012.01)

(52) U.S. Cl.
CPC ... *B60W 2520/105* (2013.01); *B60W 2520/26* (2013.01); *B60W 2552/15* (2020.02); *B60W 2552/35* (2020.02)

(58) Field of Classification Search
CPC ....... B60W 2520/105; B60W 2520/26; B60W 30/18172; B60W 50/00; B60W 2050/0022; B60W 2050/0052; B60W 2510/081; B60W 2510/083; B60W 2530/16
USPC ............................................................ 701/1
See application file for complete search history.

(56) References Cited

U.S. PATENT DOCUMENTS

| | | | | |
|---|---|---|---|---|
| 5,936,369 | A * | 8/1999 | Iwashita | G05B 19/19 318/609 |
| 6,119,062 | A * | 9/2000 | Proger | B60T 8/00 303/155 |
| 7,463,953 | B1 * | 12/2008 | Lee | B60K 35/28 701/1 |
| 9,227,605 | B2 * | 1/2016 | Okubo | B60T 8/17616 |
| 9,454,508 | B2 * | 9/2016 | Yu | G06F 17/00 |
| 10,124,806 | B2 * | 11/2018 | Raffone | B60T 8/172 |
| 11,787,410 | B1 * | 10/2023 | Oh | B60W 40/11 701/69 |
| 2003/0233887 | A1 * | 12/2003 | Terada | H02P 5/00 73/862.23 |
| 2005/0080547 | A1 * | 4/2005 | Scelers | B60K 28/16 180/197 |
| 2005/0159871 | A1 * | 7/2005 | Nakamura | B60K 6/52 303/121 |
| 2007/0026995 | A1 * | 2/2007 | Doering | F02P 5/1504 477/107 |
| 2008/0255735 | A1 * | 10/2008 | Marathe | E02F 9/2037 701/88 |
| 2009/0175601 | A1 * | 7/2009 | Ikeda | H02P 23/22 388/800 |
| 2012/0232732 | A1 * | 9/2012 | Tsuda | B60W 10/08 903/930 |
| 2012/0323460 | A1 * | 12/2012 | Okubo | B60T 8/172 701/1 |
| 2014/0067153 | A1 * | 3/2014 | Yu | G01L 3/00 701/1 |
| 2014/0197770 | A1 * | 7/2014 | Shimoda | H02P 31/00 318/490 |
| 2016/0332633 | A1 * | 11/2016 | Raffone | B60W 40/13 |
| 2018/0118212 | A1 * | 5/2018 | Mcdonnell | B60W 30/188 |
| 2020/0355497 | A1 * | 11/2020 | Yamada | B60W 50/0098 |
| 2021/0078581 | A1 * | 3/2021 | Velazquez Alcantar | B60L 3/10 |
| 2021/0114457 | A1 * | 4/2021 | Eberl | B60T 8/175 |
| 2022/0026912 | A1 * | 1/2022 | Wu | B60W 30/02 |
| 2022/0089160 | A1 * | 3/2022 | Son | B60W 30/188 |
| 2022/0289181 | A1 * | 9/2022 | Shin | B60W 40/08 |
| 2023/0059643 | A1 * | 2/2023 | Jeon | B60W 30/143 |
| 2023/0070659 | A1 * | 3/2023 | Oh | B60W 30/18172 |
| 2023/0133240 | A1 * | 5/2023 | Oh | B60W 30/18172 475/86 |
| 2023/0139187 | A1 * | 5/2023 | Chang | B60W 30/143 701/23 |
| 2023/0302914 | A1 * | 9/2023 | Oh | B60L 7/18 |
| 2023/0303054 | A1 * | 9/2023 | Oh | B60W 10/04 |
| 2023/0303087 | A1 * | 9/2023 | Oh | B60W 10/22 |
| 2023/0347747 | A1 * | 11/2023 | Oh | B60L 15/2009 |
| 2023/0398880 | A1 * | 12/2023 | Yamasaki | B60L 3/0061 |
| 2023/0406306 | A1 * | 12/2023 | Oh | B60W 10/08 |

* cited by examiner

METHOD FOR DETERMINING DRIVING STATUS OF VEHICLE

CROSS REFERENCE TO RELATED APPLICATION

The present application claims priority to Korean Patent Application No. 10-2021-0120152, filed Sep. 9, 2021, the entire contents of which is incorporated herein for all purposes by this reference.

BACKGROUND OF THE INVENTION

Field of the Invention

The present invention relates to a method for determining a driving status of a vehicle, and more particularly, to a method which may allow a vehicle to correctly classify and determine a driving state thereof, such as passing a speed bump, occurrence of wheel slip, driving on a slope with a gradient, and the like in real-time.

Description of Related Art

With the recent rapid growth of the global electric vehicle market, expectations for the performance of electric powertrains are gradually increasing. These expectations include not only acceleration performance, but also the ability to obtain traction regardless of external disturbances.

The reason that these expectations are rising is because of the characteristics of the electric powertrain apparatus are different from existing vehicles disposed with an internal combustion engine (engine). Unlike the internal combustion engine, which inevitably takes a lot of time to generate and output power due to an air flow path, a combustion process, and the like, an electromagnetic motor of the electric powertrain apparatus may generate power in a very short time. The above difference is more pronounced when the generated power is transmitted to wheels.

Furthermore, the torque generated in a conventional internal combustion engine is accompanied by a significant amount of torque ripple due to the presence of reciprocating mechanical parts that repeat the stroke. The present torque ripple must be filtered before it is transmitted to the wheels, and this may usually be done by applying damping elements such as a dual-mass flywheel and a torsion spring to the powertrain.

However, a fully electrified powertrain apparatus may provide torque with little ripple, and the unique characteristics of an electric vehicle (EV) eliminate the need for damping elements within the powertrain.

Moreover, a high rotational speed-oriented torque band and operating point of the internal combustion engine require a multi-speed transmission to change a gear ratio according to a required power level. However, since the motor essentially forms a low rotational speed-oriented torque band, a transmission component is not required.

All of these differences contribute to the responsiveness of the electric drivetrain, and effective use of longitudinal responsiveness is very important to secure product competitiveness in the vehicle market.

To meet the expectations of improved performance in recent years, the existing traction control system (TCS), hereinafter referred to as 'TCS') has been redeveloped and applied for electric vehicles. These measures may certainly enhance the overall tire slip regulation performance. The TCS may use the responsiveness of electric power to effectively intervene in a torque command, preventing tire slip.

However, the problem of unnecessary TCS operation (wheel slip reduction control such as traction control) may appear as a side effect. Since an activation condition of the TCS is determined based on speed measurement information, any disturbance affecting speed may erroneously activate the TCS. Therefore, to secure the expected performance and to actively utilize a TCS specialized for electric vehicles, a strategy for effectively preventing the above side effects is required.

FIG. 1 is a diagram illustrating a problem according to the related art and shows an example of a disturbance which may cause an erroneous activation of the TCS. Referring to FIG. 1, examples of a speed bump, a road slope, and a wheel slip are shown as disturbances which may cause the erroneous activation of the TCS.

First, the speed bump and road slope may cause the same disturbance in the longitudinal acceleration of the vehicle, and when the responsiveness of road slope (road surface slope) information estimation is improved, a controller may misunderstand a suspension pitch angle as the road slope due to an effect of the speed bump. The suspension pitch angle is information representing a vibration state of the vehicle in the pitch direction due to a stroke difference between a front suspension and a rear suspension and the suspension pitch angle occurs when either the front suspension or the rear suspension is more rebounded (tensioned) or more bumped (retracted) than the other.

Furthermore, in the case of a road slope and wheel slip, both may cause disturbance in vehicle load, and may cause an erroneous control entry even though slip does not occur on a slope when sensitive wheel slip reduction control is performed.

Furthermore, speed information at which slip does not occur is required for estimating the road slope, whereas the information of the road slope is required for estimating the slip. Therefore, when estimating the road slope according to a speed of a driving wheel, it may be mistakenly determined as a large road slope due to slippage even though a road is flat.

Furthermore, wheel slip and a speed bump may cause the same disturbance in speed compared to torque information, and when wheel slip reduction control is performed based on sensitive speed information, erroneous control entry may be induced even though slip does not occur on the speed bump.

The reason why there is a limit to maximize wheel slip suppression performance of a specialized and differentiated TCS for electric vehicles in consideration of the excellent driving force responsiveness of electric vehicles is a trade-off relationship between suppression of the above-mentioned side effects and suppression of wheel slip. In other words, if TCS operating conditions are relaxed to minimize wheel slip, the TCS will operate unnecessarily and frequently in situations such as speed bumps and road slopes to reduce vehicle drivability and if the condition is reinforced, the wheel slip occurs relatively more than in the other case. Therefore, to prevent deterioration of the wheel slip control performance caused by a trade-off problem as described above, there is a need for a technology that can correctly classify and determine vehicle driving conditions (speed bumps, wheel slip, road slopes) in real-time to solve the side effect of unnecessarily operating wheel slip reduction control without compromising wheel slip control performance.

The information disclosed in this Background of the Invention section is only for enhancement of understanding of the general background of the invention and may not taken as an acknowledgement or any form of suggestion that this information forms the prior art already known to a person skilled in the art.

BRIEF SUMMARY

Various aspects of the present invention are directed to providing a method which may allow a vehicle to correctly classify and determine a driving state thereof, such as passing a speed bump, occurrence of wheel slip, driving on a slope with a gradient, and the like, in real-time to prevent deterioration of wheel slip control performance caused by a trade-off problem as described above.

To achieve an objective described above, various aspects of the present invention provide a method for determining a driving state of a vehicle, the method including: determining, by a controller, a torque command of a vehicle drive apparatus of applying a torque to driving wheels of the vehicle based on vehicle driving information collected during driving of the vehicle; determining, by the controller, an acceleration error defined as a difference between a reference longitudinal acceleration of the vehicle interlocked with the torque command and a measured longitudinal acceleration of the vehicle based on the determined torque command and measured longitudinal acceleration information of the vehicle measured by a first sensor; determining, by the controller, an acceleration disturbance rate, which is a change rate of acceleration disturbance, defined as a difference between an actual rotational acceleration of the vehicle drive apparatus of driving the vehicle and a reference drive apparatus rotational acceleration interlocked with the torque command based on the determined torque command; integrating, by the controller, the determined acceleration disturbance rate to determine the acceleration disturbance; and determining, by the controller, a current vehicle driving state of the vehicle based on the determined acceleration error, the determined acceleration disturbance rate and the acceleration disturbance.

Accordingly, according to the method for determining the driving state of a vehicle according to various exemplary embodiments of the present invention, the controller in the vehicle may correctly distinguish and determine the vehicle driving state, such as passing a speed bump, occurrence of wheel slip, driving on a slope with a gradient, and the like, and thus the deterioration of wheel slip control performance caused by the described-above trade-off problem may effectively prevented, and a problem of unnecessarily operating a TCS may be solved without compromising trade-off-considered wheel slip control performance.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
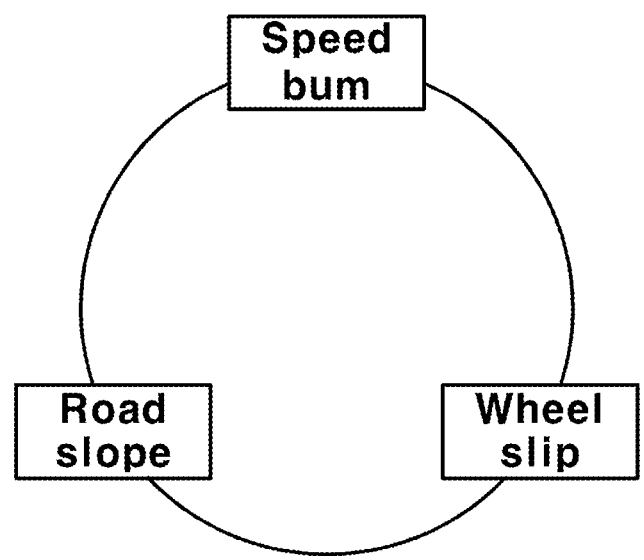
FIG. 1 is a view exemplarily illustrating a problem according to the related art.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description, the structural or functional description specified to exemplary embodiments according to the concept of the present invention is directed to describe the exemplary embodiments of the present invention, so it should be understood that the present invention may be variously embodied, without being limited to the exemplary embodiments.

Embodiments described herein may be changed in various ways and various shapes, so specific embodiments are shown in the drawings and will be described in detail in the present specification. However, it should be understood that the exemplary embodiments according to the concept of the present invention are not limited to the exemplary embodiments which will be described hereinbelow with reference to the accompanying drawings, but all of modifications, equivalents, and substitutions are included in the scope and spirit of the present invention.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Furthermore, the terms used herein to describe a relationship between elements, that is, "between", "directly between", "adjacent", or "directly adjacent" should be construed in the same manner.

The terminology used herein is for the purpose of describing various exemplary embodiments only and is not intended to limit the present invention. Singular forms are intended to include plural forms unless the context clearly indicates otherwise. It will be further understood that the terms "comprises" or "comprising" used in the present specification, specify the presence of stated features, steps, operations, components, parts, or a combination thereof, but do not preclude the presence or addition of one or more other features, numerals, steps, operations, components, parts, or a combination thereof.

The present invention is directed to providing a method which may allow a vehicle to correctly classify and determine a driving state of the vehicle, such as passing a speed bump, occurrence of wheel slip, driving on a slope with a gradient, and the like, in real-time.

Therethrough, when wheel slip reduction control (traction control, etc.) specialized for electric vehicles is applied, deterioration in wheel slip control performance caused by a trade-off problem between suppression of side effects, such as unnecessary control operation and the like, and suppression of wheel slip may be efficiently prevented, and a problem of unnecessarily operating wheel slip reduction control may be solved without negotiation and compromising the wheel slip control performance in consideration of the trade-off problem.

In the following description, one of the vehicle driving states is referred to as a state of passing a speed bump which is an obstacle on a road surface, but this is an example of passing a road surface portion having a height difference (height step of the road surface), and passing the bump may be included in the category that a vehicle passes a portion having a height difference on a tire grounding road surface.

Accordingly, in the following description, the passage of the speed bump may be replaced by the passage of the portion having a height difference on a ground road surface in contact with a tire (hereinafter referred to as a 'height step portion' of the road surface). For example, in the following description, the speed bump may be replaced with a protruding bump on a road that acts as an obstacle when the tire rolls, rather than for preventing speeding.

Furthermore, since a pothole on a road surface or a depression formed in a shape recessed into the road surface, such as a puddle, is the portion having a height difference on the ground road surface in contact with the tire, in the following description, a speed bump may be also replaced with a pothole or a depression, such as a puddle, existing on the road surface. In other words, the height difference portion on the ground road surface in contact with the tire includes both the pothole and other depressions, such as a puddle, as well as a speed bump and other protrusions that are obstacles.

Hereinafter, the present invention will be described in detail, in various exemplary embodiments of the present invention, a vehicle monitors a difference between a longitudinal acceleration (reference longitudinal acceleration) value of the vehicle as a reference and a longitudinal acceleration (measured longitudinal acceleration) value of the vehicle measured by a sensor in real-time. Here, the difference between the reference longitudinal acceleration and the measured longitudinal acceleration is defined as an 'acceleration error'.

In various exemplary embodiments of the present invention, disturbance in motor dynamics is observed, and the disturbance and a change rate (slope) value of the disturbance are monitored in real time. Here, the disturbance and the change rate of the disturbance are respectively defined as an 'acceleration disturbance' and an 'acceleration disturbance rate'.

In various exemplary embodiments of the present invention, the vehicle driving state may be determined by being divided into one or two of a speed bump (one of the height steps of the road) passing state, a wheel slip occurrence state, and a driving state on a slope with a road gradient. That is, the vehicle driving state may be determined as the speed bump passing state, the wheel slip occurrence state, a speed bump passing and wheel slip occurrence state, or a slope driving state.

The present invention may use the acceleration error and the acceleration disturbance rate to classify and determine passing a speed bump and the occurrence of wheel slip. Furthermore, the present invention may determine that the vehicle is in a driving state on a slope with a road gradient when acceleration disturbance occurs while being not in the speed bump passing state and the wheel slip occurrence state. In the instant case, a magnitude of the acceleration disturbance may be converted into a road slope, being determined as a road slope value.

Furthermore, the acceleration disturbance may be additionally used to classify and determine the speed bump passing state. As a result, it is possible to determine whether to operate wheel slip reduction control based on vehicle driving state information determined as described above, so that it is determined whether to operate the control based on the correct vehicle driving state, and thus unnecessary control operation and control malfunction may be prevented.

Figure 2:
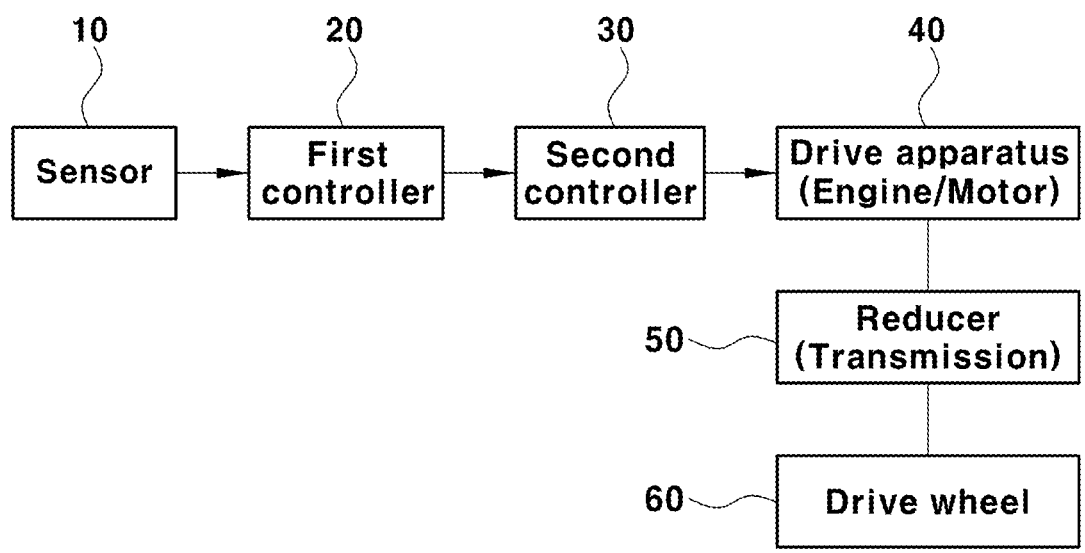
FIG. 2 is a block diagram illustrating a configuration of an apparatus configured for determining a driving state of a vehicle, controlling a wheel slip reduction, and controlling a driving force of a vehicle according to various exemplary embodiments of the present invention.

FIG. 2 is a block diagram illustrating a configuration of an apparatus configured for determining a driving state of a vehicle, controlling a wheel slip reduction, and controlling a driving force of the vehicle according to various exemplary embodiments of the present invention.

In the following description, the driving force is a force generated by a drive apparatus 40 for driving a vehicle, and may be a force which is a sum of forces acting between the tires of driving wheels 60 and a road surface. That is, the driving force may include a force generated on the driving wheels 60 by the driving apparatus 40, and the force generated on the driving wheels 60 is generated by a torque applied from the driving apparatus (e.g., a motor) 40 for driving the vehicle to the driving wheels 60, if the driving apparatus 40 of the vehicle is a motor, the torque applied to the driving wheels 60 is a driving torque output when the motor is driven or a regenerative braking torque by the motor during regeneration. In the instant case, the driving force is a driving force including a regenerative braking force when the motor is regenerated as well as a driving force output when the motor is driven.

The control of the driving force may be performed by controlling the torque of the driving apparatus 40, wherein the torque is a torque applied to the driving wheels 60 and means both the driving torque by the motor and the regenerative braking torque by the motor. Furthermore, in the following description, 'torque' and 'torque command' may be replaced with 'driving force' and 'driving force command'.

Referring to FIG. 2, the apparatus of determining the vehicle driving state, controlling wheel slip reduction, and controlling the driving force according to various exemplary embodiments of the present invention may include a first controller 20 configured to determine and output a torque command from vehicle driving information, a second controller 30 configured to control the operation of the vehicle drive apparatus according to the torque command received from the first controller 20, and the vehicle drive apparatus 40, as a driving source for driving the vehicle, whose operation (torque output) is controlled by the second controller 30.

The vehicle drive apparatus 40 may be a motor in an electric vehicle. The torque and rotational force output by the vehicle drive apparatus 40 are transmitted to the driving wheels 60 through a reducer 50 as shown in FIG. 2.

The torque command is determined and generated in the vehicle based on vehicle driving information collected during driving of the vehicle, wherein vehicle driving information may be sensor detection (measurement) information which is detected by a sensor 10 and is input to the first controller 20 through a vehicle network.

The sensor 10 for detecting the vehicle driving information may include an accelerator position sensor (APS) for detecting a driver's accelerator pedal input value, a brake pedal position sensor (BPS) for detecting the driver's brake pedal input value, a sensor for detecting a drivetrain speed, a first sensor for detecting a longitudinal acceleration of the vehicle, and a second sensor for detecting a vehicle speed.

The drivetrain speed may be the rotation speed of the vehicle drive apparatus 40 or the rotation speed (wheel speed) of the driving wheel 60. Here, the rotation speed of the vehicle drive apparatus may be a rotation speed of the motor (motor speed). In the instant case, the sensor for detecting the speed of the drivetrain becomes a sensor for detecting the speed of the motor, which may be a resolver for detecting the position of a rotor of the motor. Alternatively, the sensor for detecting the drivetrain speed may be a wheel speed sensor for detecting the rotation speed (wheel speed) of the driving wheel.

The first sensor for detecting the longitudinal acceleration of the vehicle may be a known acceleration sensor provided in a vehicle. Furthermore, the second sensor for detecting the vehicle speed may also be a wheel speed sensor. Obtaining the vehicle speed information from a signal of the wheel speed sensor is a well-known technique in the art, and thus a detailed description thereof will be omitted. As sensor detection information detected by the sensor 10, a driver's accelerator pedal input value (APS value), a driver's brake pedal input value (BPS value), the speed (rotation speed) of the vehicle drive apparatus, the vehicle speed, and the like may be selectively used as the vehicle driving information for determining and generating the torque command.

In the vehicle driving information, the accelerator pedal input value and the brake pedal input value may be referred to as driver input information, and the speed and vehicle speed of the vehicle drive apparatus 40 detected by the sensor 10 may be referred to as vehicle state information. Furthermore, as the sensor detection information, the longitudinal acceleration of the vehicle detected by the first sensor (acceleration sensor) is used to determine an acceleration error as will be described later.

Furthermore, the vehicle driving information may be information determined by the first controller 20, or information (e.g., required driving force information) input to the first controller 20 through the vehicle network from another controller (e.g., an ADAS controller) in the vehicle. In the instant case, the first controller 20 may be a vehicle control unit (VCU) or hybrid control unit (HCU) that generates a torque command based on the vehicle driving information in a conventional vehicle.

A method for determining and generating a torque command for controlling the operation of the vehicle drive apparatus 40 from the vehicle driving information collected from a vehicle and a process thereof are well-known in the art, and thus a detailed description thereof will be omitted.

When the torque command is determined and output by the first controller 20, the operation of the vehicle drive apparatus 40 is controlled by the second controller 30, and the vehicle may be driven while the power of the controlled drive apparatus 40 is transmitted to the driving wheel 60 through the reducer 50.

The second controller 30 may be a motor control unit (MCU) that drives a motor, which is the vehicle drive apparatus 40 through an inverter according to the torque command controls the operation of the motor.

In the above description, a control subject includes the first controller and the second controller, but a vehicle driving state determination process according to various exemplary embodiments of the present invention may be performed by one integrated control element instead of a plurality of controllers.

In the instant case, both the plurality of controllers and the one integrated control element may be collectively referred to as a controller, and the vehicle driving state determination process according to various exemplary embodiments of the present invention described below may be performed by the present controller. That is, the controller may refer to both the first controller and the second controller. Hereinafter, a method of determining the vehicle driving state performed by the controller will be described in more detail.

First, a process for determining an acceleration error will be described. As described above, the acceleration error is determined by a difference between a longitudinal acceleration of a vehicle as a reference (hereinafter referred to as 'reference longitudinal acceleration') and a longitudinal acceleration of the vehicle measured by a sensor (hereinafter referred to as 'measured longitudinal acceleration'). Here, the measured longitudinal acceleration may be a value obtained by filtering an actual sensor measurement value or post-processing the same through a predetermined separate processing process.

The measured longitudinal acceleration is affected by the irregularity of a road surface. On the other hand, the reference longitudinal acceleration is not affected by the irregularity of the road surface. Accordingly, the acceleration error obtained as a difference between the two may be used as an index indicating the presence or absence of irregularities on the road surface.

Here, it is important to design so that the reference longitudinal acceleration is not affected by the irregularity of the road surface. In various exemplary embodiments of the present invention, the torque command is for controlling the operation of the vehicle drive apparatus 40 for driving the vehicle, and since it is a command for a torque applied to the driving wheel 60 of the vehicle, it may be called a wheel-based wheel torque command.

In various exemplary embodiments of the present invention, a force caused by a wheel torque applied to the driving wheels may be referred to as a wheel driving force and the wheel driving force may be defined as a sum of forces. In various exemplary embodiments of the present invention, to prevent the reference longitudinal acceleration from being affected by the irregularity of the road surface, a reference longitudinal acceleration profile interlocked with the wheel torque command is generated by use of the wheel torque command (or wheel driving force command).

The wheel torque command may be a torque command determined based on vehicle driving information and may be a combination of a motor torque command (drive torque command or regenerative braking torque command) of the vehicle drive apparatus 40 and a braking torque command of a braking apparatus. The wheel driving force, which is a force generated on the driving wheels by the vehicle drive apparatus and the braking apparatus according to the wheel torque command, and the longitudinal acceleration have the following relationship.

Wheel driving force−Rolling resistance−Air resistance=Vehicle equivalent inertia×Vehicle longitudinal acceleration  [Equation 1]

In Equation 1, the wheel driving force is a conceptual force including both the driving force applied to the wheel by the vehicle drive apparatus and the braking force applied to the wheel by the braking apparatus. Since the effect on the irregularity of the road surface is not considered in Equation 1 above, the longitudinal acceleration obtained based on Equation 1 acts as a reference value which is not affected by the irregularity of the road surface. That is, the longitudinal acceleration in Equation 1 may be referred to as a reference longitudinal acceleration, and the reference longitudinal acceleration may be determined by Equation 1.

The reference longitudinal acceleration may be obtained by use of a filter and a state observer (first observer) designed based on Equation 1 as described below without determining through Equation 1. Resistance force and equivalent inertia information in Equation 1 may use a previously modeled value.

Furthermore, a preset value may be used as a function of a vehicle speed or a steering value (e.g., a steering angle) which is steering input information among the vehicle driving information.

In Equation 1, the equivalent inertia of the vehicle may use a value learned in real-time. This is a value that varies depending on the weight of the vehicle and may be learned by use of a predetermined weight estimation method, etc., as will be described later.

As a result, the difference between the reference longitudinal acceleration determined by Equation 1 and the measured longitudinal acceleration measured by the first sensor (acceleration sensor) may be calculated and determined as an acceleration error.

Furthermore, as another example of determining the acceleration error in various exemplary embodiments of the present invention, it is possible to determine the acceleration error using an observer model. Equations 2 to 5 below are equations set in an adaptive state observer (first observer) in the controller.

$$\hat{a}_{fil} \equiv \dot{\hat{v}}_{x,fil} = a_{meas} + L_{fil}(v_{x,meas} - \hat{v}_{x,fil}) \quad \text{[Equation 2]}$$

$$\hat{a}_{tq} \equiv \dot{\hat{v}}_{x,tq} = \frac{T_{whl}}{I'_{nom}}\hat{\gamma}_{scl} + \frac{T_{whl}}{I'_{nom}} - a_{drag} + L_{p1}(\hat{v}_{x,fil} - \hat{v}_{x,tq}) + \hat{\tilde{a}}_{tq} \quad \text{[Equation 3]}$$

$$\dot{\hat{\tilde{a}}}_{tq} = L_{i1}(\hat{v}_{x,fil} - \hat{v}_{x,tq}) \quad \text{[Equation 4]}$$

$$\dot{\hat{\gamma}}_{scl} = \gamma \hat{T}_{whl} L_{i1}(\hat{v}_{x,fil} - \hat{v}_{x,tq}) \quad \text{[Equation 5]}$$

Equations 2 to 5 may be expressed again as Equation 6 below.

$$\frac{d}{dt}\begin{bmatrix}\hat{v}_{x,fil}\\ \hat{v}_{x,tq}\\ \hat{\tilde{a}}_{tq}\\ \hat{\gamma}_{scl}\end{bmatrix} = \begin{bmatrix}-L_{fil} & 0 & 0 & 0\\ L_{p1} & -L_{p1} & 1 & \frac{T_{whl}}{I'_{nom}}\\ L_{i1} & -L_{i1} & 0 & 0\\ \gamma \hat{T}_{whl}L_{i1} & -\gamma \hat{T}_{whl}L_{i1} & 0 & 0\end{bmatrix}\begin{bmatrix}\hat{v}_{x,fil}\\ \hat{v}_{x,tq}\\ \hat{\tilde{a}}_{tq}\\ \hat{\gamma}_{scl}\end{bmatrix} + \begin{bmatrix}L_{fil}v_{x,meas} + a_{meas}\\ \frac{T_{whl}}{I'_{nom}} - a_{drag}\\ 0\\ 0\end{bmatrix} \quad \text{[Equation 6]}$$

Definitions of each sign in Equations 2 to 6 are as follows.

$v_{x,meas}$: Measured speed (Measured longitudinal speed of a vehicle)

$a_{meas}$: Measured acceleration (Measured longitudinal acceleration of the vehicle)

$\hat{v}_{x,fil}$: Filtered acceleration (Longitudinal speed of the vehicle filtered after measurement $\hat{a}_{fil}$: Filtered acceleration (Longitudinal acceleration of the vehicle filtered after measurement $L_{fil}$: Filter gain $T_{whl}$: Wheel torque (Wheel command)

$I'_{nom}$: Scaled vehicle equivalent inertia $a_{drag}$: Drag acceleration of the vehicle $L_{p1}$: P gain of a first observer $L_{i1}$: I gain of the first observer $\hat{\gamma}_{scl}$: Estimated torque scale factor $\hat{v}_{x,tq}$: Estimated speed (Estimated longitudinal speed of the vehicle)

$\hat{a}_{tq}$: Estimated accelerate (Estimated longitudinal acceleration of the vehicle)

$\hat{\tilde{a}}_{tq}$: Estimated acceleration error $\gamma$: Adaptive gain

Some of the symbols 'x' mean the longitudinal direction with respect to the vehicle. 'meas' indicates a measured value, and 'fil' indicates a value filtered by a filter. In the above equation, the speed and the acceleration are the longitudinal speed and the longitudinal acceleration of the vehicle. For example, the filtered speed and the filtered acceleration are the longitudinal speed and the longitudinal acceleration of the vehicle that are respectively detected and measured by the first sensor and the second sensor in the vehicle and then filtered by the filter. Furthermore, the drag acceleration ($a_{drag}$) in the above equation is a known control variable in vehicle control, and may be determined and used, in the controller, as a value according to the vehicle speed by a map that utilizes the vehicle speed ($v_{x,meas}$, Measured speed) as an input.

In various exemplary embodiments of the present invention, the filtered longitudinal acceleration after measurement, that is, the filtered acceleration ($\hat{a}_{fil}$) in the above equation, is the measured longitudinal acceleration, the estimated acceleration ($\hat{a}_{tq}$) is the reference longitudinal acceleration. Adaptation is performed by use of Equation 5 to obtain the reference longitudinal acceleration. Furthermore, $\hat{a}_{tq}$, which is the estimated acceleration, is an acceleration error to be obtained through the observer (the first observer), that is, a difference between the reference longitudinal acceleration and the measured longitudinal acceleration (=Filtered acceleration−Acceleration error).

Next, a process of determining an acceleration disturbance and an acceleration disturbance rate will be described. As mentioned above, the acceleration disturbance may be obtained by motor dynamics. A rotational acceleration of a motor is determined by the torque and equivalent (rotational) inertia of the motor, which has the following relational expression.

Drive apparatus torque−Rotation resistant torque=Equivalent rotational inertia×Drive apparatus rotational acceleration  [Equation 7]

In Equation 7, the vehicle drive apparatus torque may be a motor torque and the vehicle drive apparatus rotational acceleration may be a motor rotational acceleration. Also, the drive torque command may be a drive gear torque command determined from the vehicle driving information as described above and the drive gear torque command may be a motor torque command.

In Equation 7, information related to the rotation resistant torque and the equivalent inertia, which are resistance forces, may use, as information related to the vehicle drive apparatus, a value previously modeled in the controller or a value preset in the controller by a function for the vehicle speed, a steering value (e.g., a steering angle), which is steering input value, among the vehicle driving information.

In the controller, the vehicle drive apparatus rotational acceleration calculated and estimated by Equation 7, specifically, the motor rotational acceleration becomes a reference value, and the controller is configured to compare the actual motor rotational acceleration (reference drive apparatus rotational acceleration), which is the reference value, with the rotational acceleration of the vehicle drive apparatus).

The actual motor rotational acceleration is a measured motor rotational acceleration obtained by differentiating the motor rotation speed (drive apparatus rotation speed) measured by a third sensor (resolver). At the instant time, in the controller, the difference between the reference motor rotational acceleration and the measured motor rotational acceleration is obtained as an acceleration disturbance. Further, a value obtained by differentiating the acceleration disturbance becomes an acceleration disturbance rate in the controller.

As another example of determining the acceleration disturbance and the acceleration disturbance rate, the controller may be configured to determine the acceleration disturbance by use of an unknown input observer (second observer). Equations 8 and 9 below are model equations of the unknown input observer according to various exemplary embodiments of the present invention, and are equations set in a state observer (second observer) in the controller configured for determining the acceleration disturbance and the acceleration disturbance rate.

$$\dot{\hat{\omega}}_{mot} = \frac{1}{r_g} T_{whl} + L_{p2}(\omega_{mot} - \hat{\omega}_{mot}) + \tilde{\alpha}_{mot} \quad \text{[Equation 8]}$$

$$\dot{\tilde{\alpha}}_{mot} = L_{i2}(\omega_{mot} - \hat{\omega}_{mot}) \quad \text{[Equation 9]}$$

Definitions of each sign in Equations 8 and 9 are as follows.

$\omega_{mot}$: Measured motor (drive apparatus) rotation speed
$\hat{\omega}_{mot}$: Estimated motor (drive apparatus) rotation speed
$\dot{\tilde{\alpha}}_{mot}$: Acceleration disturbance rate
$\tilde{\alpha}_{mot}$: Estimated motor (drive apparatus) rotational acceleration error
$L_{p2}$: P gain of a second observer
$L_{i2}$: I gain of the second observer
$r_g$: Effective gear ratio
$T_{whl}$: Wheel torque (Torque command)

In Equation 8, the effective gear ratio $r_g$ means a reduction ratio (gear ratio) from the motor (drive device) to the driving wheels, and $\dot{\tilde{\alpha}}_{mot}$ is the acceleration disturbance rate in Equation 9. Furthermore, if the present acceleration disturbance rate is integrated, the acceleration disturbance may be obtained.

As shown in Equation 9, the acceleration disturbance rate ($\dot{\tilde{\alpha}}_{mot}$) may be obtained in the controller from the motor rotation speed measured by the sensor (resolver) and the motor rotation speed estimated by the equation.

The acceleration disturbance rate ($\dot{\tilde{\alpha}}_{mot}$) may be determined by use of the motor rotation speed measured by the third sensor, the motor rotation speed estimated by Equation 7, and the I gain ($L_{i2}$) of the observer (second observer).

It may be obtained as a value of the acceleration disturbance rate ( ) in the controller. Here, the estimated motor rotation speed may be obtained in the controller by integrating the motor rotational acceleration, that is, the reference motor rotational acceleration, obtained by Equation 7.

As described above, in various exemplary embodiments of the present invention, when the acceleration disturbance rate is obtained by use of Equations 8 and 9 of the observer, the controller may obtain the acceleration disturbance by integrating the acceleration disturbance rate. In various exemplary embodiments of the present invention, the acceleration disturbance rate ($\tilde{\alpha}_{mot}$) has the meaning of a value obtained by differentiating the motor rotational acceleration error represented as $\tilde{\alpha}_{mot}$ in Equation 8. Furthermore, the acceleration disturbance means the motor rotational acceleration error ($\tilde{\alpha}_{mot}$), that is, the difference between the reference motor rotational acceleration and the measured motor rotational acceleration. In other words, the estimated motor rotational acceleration error ($\tilde{\alpha}_{mot}$) means the desired acceleration disturbance.

In various exemplary embodiments of the present invention, a speed bump, wheel slip, and a road slope all increase the acceleration disturbance. This is because all three cases correspond to disturbances during drive of a vehicle. However, among them, the road slope does not increase the acceleration disturbance rate.

Since a sudden change occurs in the acceleration disturbance only when the vehicle passes through a speed bump and when wheel slip occurs, the acceleration disturbance rate is increased. Therefore, whether the disturbance is due to the slope or the disturbance due to the wheel slip or the speed bump may be determined based on a value of the disturbance rate.

It is already known in the art that a separate acceleration disturbance for only observing the slope, not for determining slip, may be obtained through a measured value of a longitudinal acceleration sensor (first sensor) and wheel speed information.

In the description of the present invention, an example of the speed bump is given, but it is possible to expand not only these speed bumps but also obstacles, such as protrusions, puddles, potholes, and the like, having road surface irregularities as a height difference portion of the road surface and apply the description to the height difference portion of the road surface.

Hereinafter, a method for classifying and determining a current vehicle driving state (passage of a height step, wheel slip occurrence, slope driving) based on information on the acceleration error, the acceleration disturbance, and the acceleration disturbance rate determined in real-time as described above will be described in detail. According to the principle described above, the acceleration error has a characteristic that increases when the road surface irregularity such as a height step portion increases, and does not increase in a wheel slip condition. Furthermore, according to the above-described principle, the acceleration disturbance has a characteristic which is increased in the presence of road surface irregularities, wheel slip conditions, and slope driving, and the acceleration disturbance rate has a characteristic which is increases only in the presence of the road surface irregularities and the wheel slip conditions.

Accordingly, the following method may be used to classify and determine a passing state of a height step portion such as a speed bump, a wheel slip occurrence state, and a slope gradient driving state as the current vehicle driving state. In the description below, the 'magnitude' of each item may be in a specific direction (+ or −) and may be a negative or positive value, so an absolute value may be used for comparison with a threshold. As shown below, a vehicle driving state may be determined by comparing the magnitudes of the acceleration disturbance, the acceleration disturbance rate, and the acceleration error. First, if the magnitude of the acceleration disturbance rate is greater than a preset disturbance rate threshold, and at a same time, the magnitude of the acceleration error is greater than a preset error threshold, the controller may be configured to determine that the current vehicle driving state is the passing state of a height step portion such as a speed bump.

If the magnitude of the acceleration disturbance rate is greater than the preset disturbance rate threshold, and at a same time, the magnitude of the acceleration error is less than the preset error threshold, the controller may be configured to determine that the current vehicle driving state is the wheel slip occurrence state.

Further, if the magnitude of the acceleration disturbance is greater than a preset disturbance threshold, and at a same time, the magnitude of the acceleration disturbance is less than the preset disturbance rate threshold, the controller may be configured to determine that the current vehicle driving state is the slope driving state.

Figure 3:
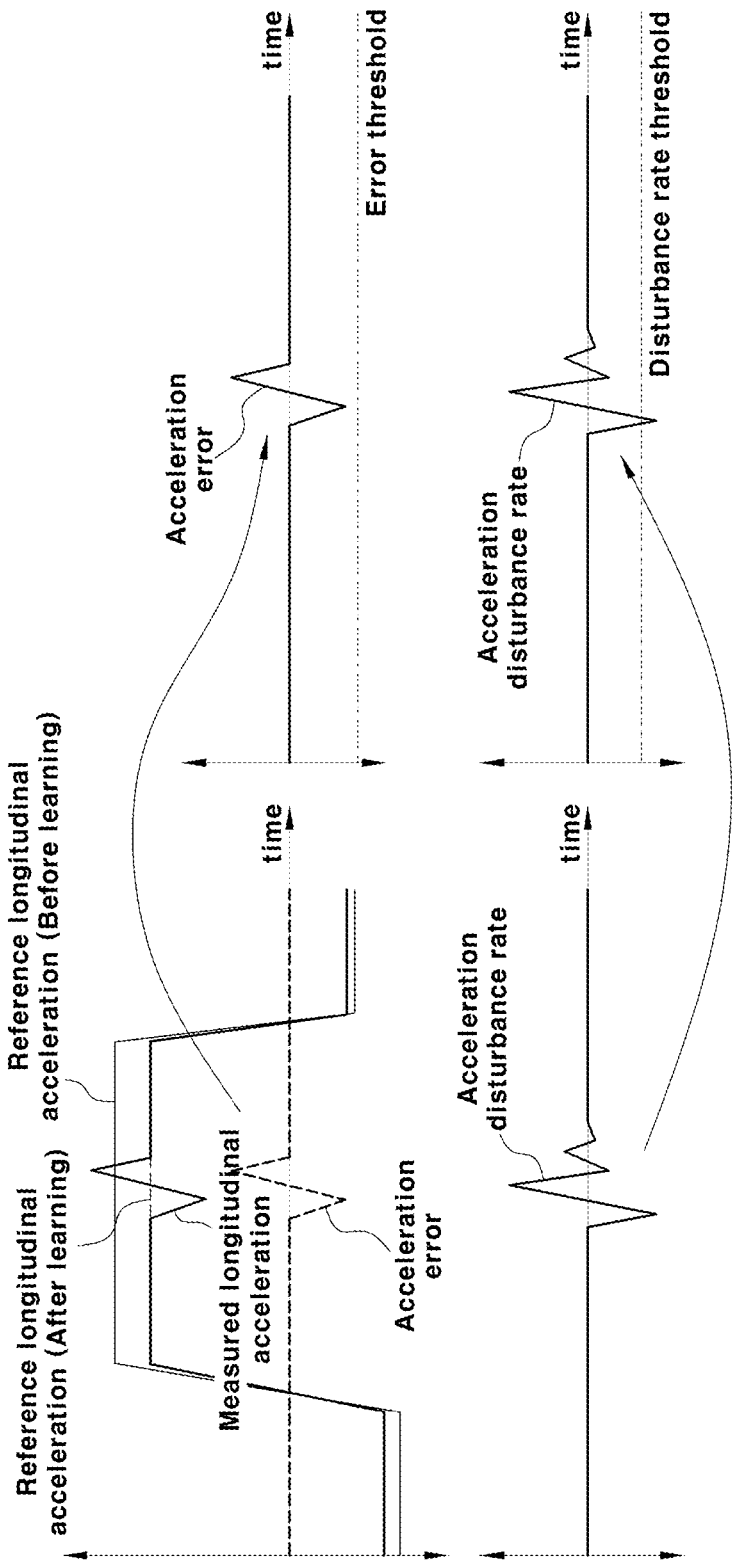
FIG. 3 is a view exemplarily illustrating an example in which wheel slip occurrence is determined in various exemplary embodiments of the present invention.
Figure 4:
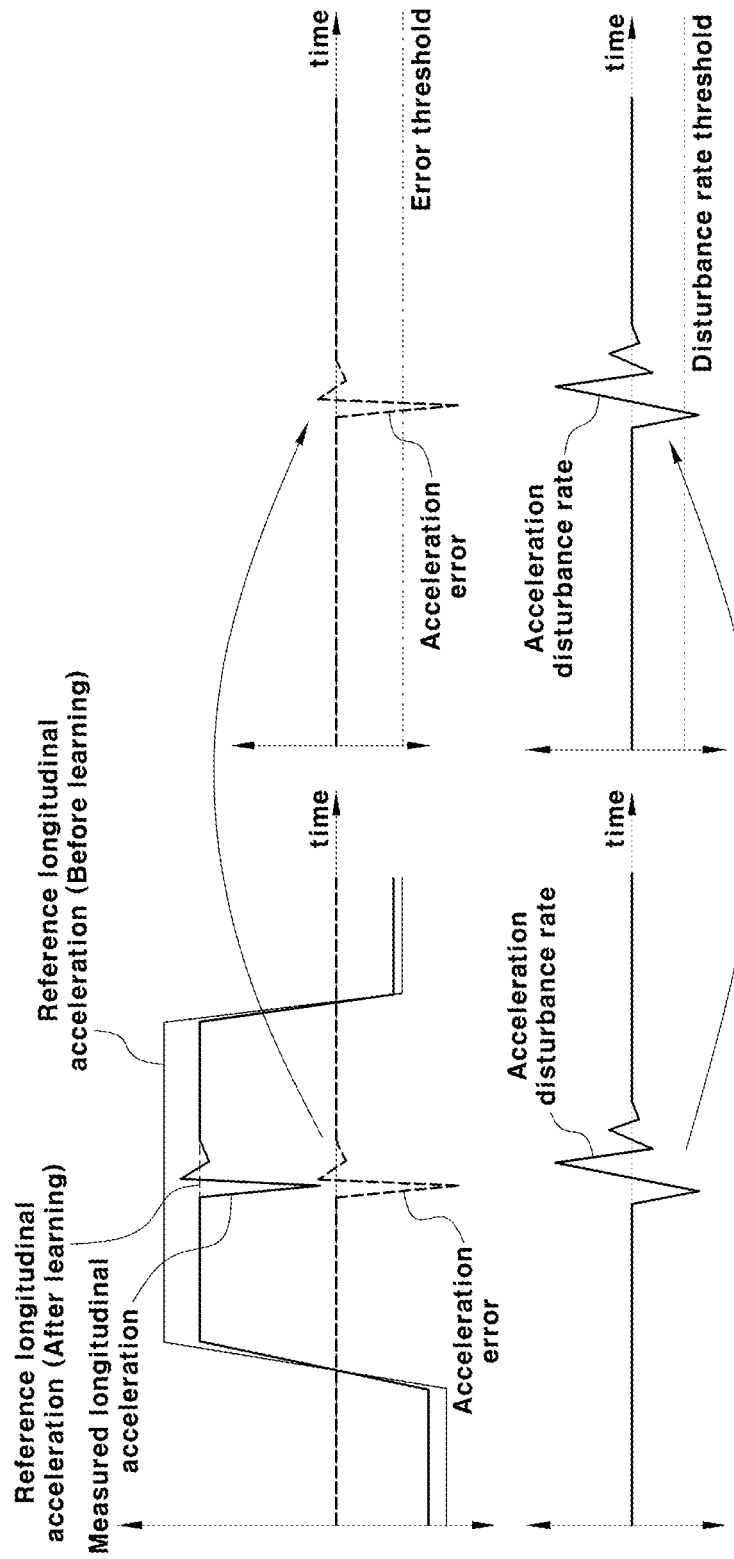
FIG. 4 is a view exemplarily illustrating an example in which a speed bump passing state is determined in various exemplary embodiments of the present invention.
Figure 5:
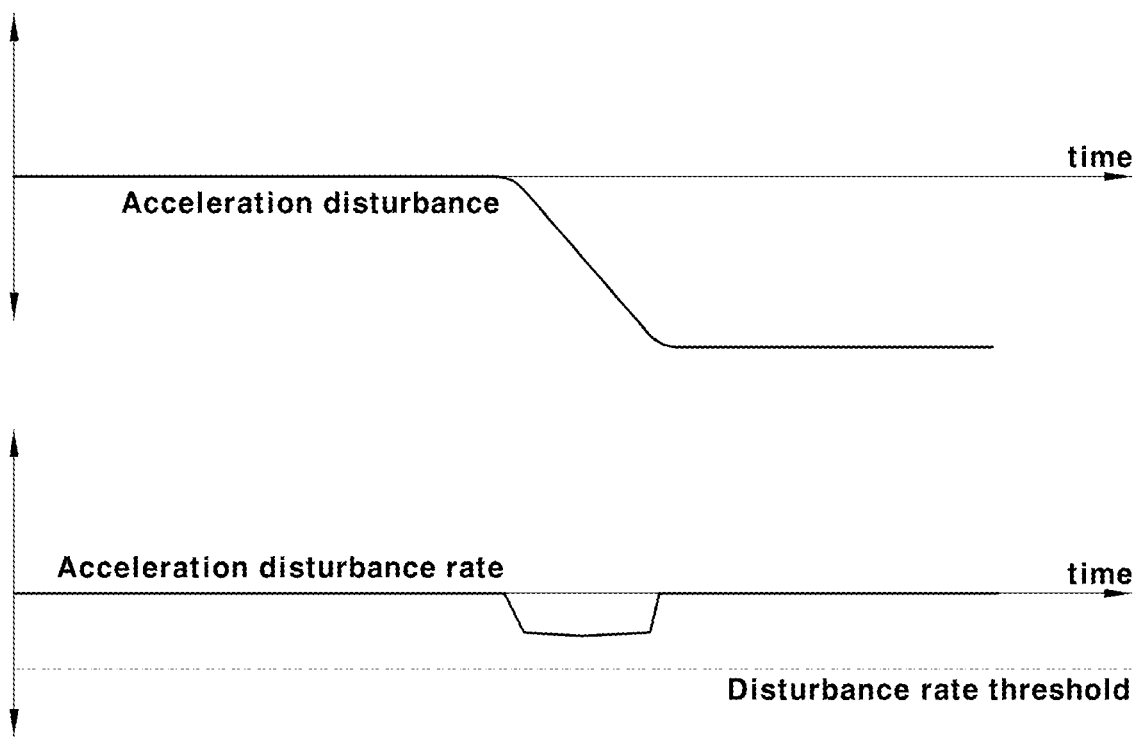
FIG. 5 is a view exemplarily illustrating an example in which a driving state on a slope is determined in various exemplary embodiments of the present invention.

FIG. 3 is a view exemplarily illustrating an example in which wheel slip occurrence is determined in various exemplary embodiments of the present invention, FIG. 4 is a view exemplarily illustrating an example in which a speed bump passing state is determined in various exemplary embodiments of the present invention, and FIG. 5 is a view exemplarily illustrating an example in which a slope driving state is determined in various exemplary embodiments of the present invention.

First, in FIG. 3, the reference longitudinal acceleration and the measured longitudinal acceleration before and after learning are exemplified and it is shown that the acceleration error is determined by a difference between the reference longitudinal acceleration and the post-learning measured longitudinal acceleration.

Furthermore, in the example of FIG. 3, based on absolute values, the acceleration disturbance rate (absolute value) is greater than the disturbance rate threshold value, but the acceleration error (absolute value) is less than the error threshold value, so that the controller is configured to determine that the vehicle is in the wheel slip occurrence state.

Further, in the example of FIG. 4, based on absolute values, the acceleration error is determined by a difference between the post-learning reference longitudinal acceleration and the measured longitudinal acceleration, and the acceleration error (absolute value) is greater than the error threshold, and the disturbance rate (absolute value) is greater than the disturbance rate threshold, so that the controller is configured to determine that the vehicle is in the passing state of the height step portion of the road surface, such as a speed bump.

Furthermore, as shown in FIG. 5, based on absolute values, if the magnitude (absolute value) of the acceleration disturbance rate does not exceed the disturbance rate threshold value, the current vehicle driving state is not the passing state of the height step portion of the road surface and the wheel slip occur state, so that the controller may convert the acceleration disturbance into a value corresponding to the slope of the road and may use the converted value. In the case of the slope, a real-time value is required, so a threshold value is not necessarily required and the observed acceleration disturbance shown in FIG. 5 becomes a meaningful value corresponding to the slope of the road.

On the other hand, based on the absolute values, when it is determined that the magnitude (absolute value) of the acceleration disturbance rate exceeds the disturbance rate threshold, the controller holds a slope value determined immediately before determination as a road slope value. For example, as shown in FIG. 3 and FIG. 4, when it is determined that the wheel slips state and the passing state of a height step portion such as a speed bump, the controller holds the determined slope value immediately before the determination as the road slope value.

Figure 6:
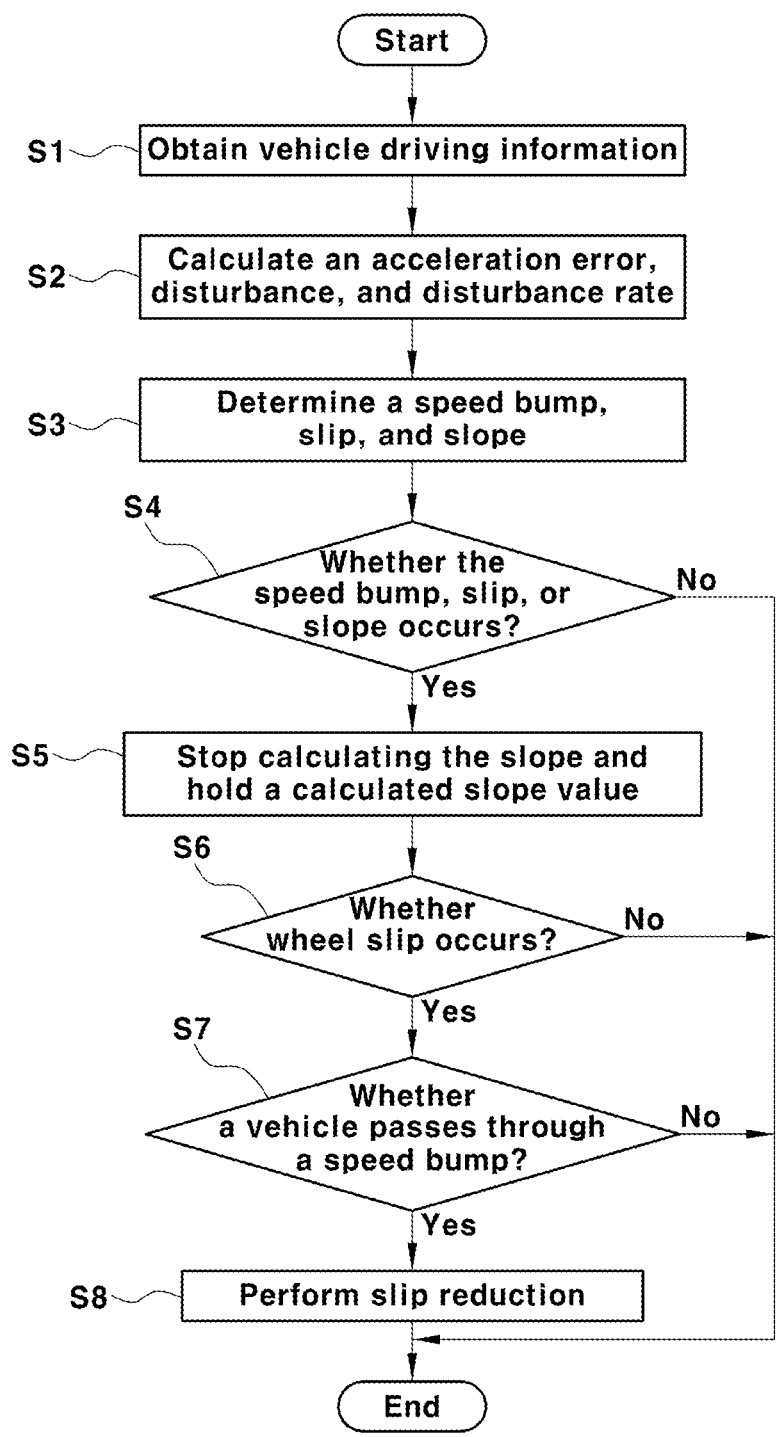
FIG. 6 is a flowchart illustrating an entire process of determining a vehicle driving state and determining whether to enter wheel slip reduction control according to various exemplary embodiments of the present invention.

FIG. 6 is a flowchart illustrating an overall process of determining a vehicle driving state and determining whether to enter wheel slip reduction control according to various exemplary embodiments of the present invention and with reference to this, the entire process is referred to as follows.

First, real-time vehicle driving information is obtained from a controller (first controller) during vehicle driving (S1), and then, as described above, an acceleration error, an acceleration disturbance, and an acceleration disturbance rate are determined and determined in real-time based on the vehicle driving information (S2).

When the acceleration error, the acceleration disturbance, and the acceleration disturbance rate are determined as described above, the controller is configured to determine a vehicle driving state based on this real-time information (S3). At the instant time, if it is determined that the vehicle driving state is a passing state of a speed bump or a wheel slip occurrence state, the controller is configured to stop determining a slope through the acceleration disturbance and holds a slope value determined immediately before speed bump or wheel slip determination as a road slope value (S4, S5).

That is to exclude the effect because the wheel speed information is used for acceleration disturbance determination for estimating the slope and the wheel speed information is affected by the speed bump and the wheel slip.

Accordingly, if it is determined that wheel slip has occurred rather than the passing state of a speed bump (S6, S7), a known wheel slip reduction control such as traction control (TCS control) for reducing wheel slip is started by the controller (S8). On the other hand, if it is determined that only the passing state of a speed bump has occurred without determining the occurrence of wheel slip, the controller does not perform the wheel slip reduction control. If the wheel slip reduction control is performed while passing through a speed bump, drivability may deteriorate, so that the wheel slip reduction control may not be performed. Therefore, in various exemplary embodiments of the present invention, even if the occurrence of wheel slip is detected and determined, the wheel slip reduction control is not performed when the passing state of a speed bump is detected and determined.

Conventionally, it was difficult to determine wheel slip and a speed bump individually or an overlapping manner, so it was impossible to prohibit wheel slip reduction control entry when a passing state of a speed bump was detected and determined as described above.

Accordingly, according to a method for determining a vehicle driving state according to various exemplary embodiments of the present invention, the vehicle driving state such as the passage of a speed bump (a height step portion of a road surface), the occurrence of wheel slip, and the occurrence of a slope (driving on a slope), and the like are correctly classified and determined in real-time. As a result, the deterioration of wheel slip control performance may be effectively prevented, and a problem of unnecessarily operating wheel slip reduction control such as TCS may be solved without compromising wheel slip control performance in consideration of the aforementioned trade-off problem.

It is possible to independently determine a passing state of a speed bump, a wheel slip occurrence state, and a slope driving state may be independently determined and overlapping detection of the passing state of a speed bump and the wheel slip occurrence state may be determined in an overlapping manner. Accordingly, it is possible to reliably prevent a control malfunction due to a speed bump or slope during wheel slip reduction control.

Accordingly, as the malfunction of the wheel slip reduction control is prevented, provided is an advantage of reducing delay at the start of the wheel slip reduction control and increasing the wheel slip reduction control performance. Furthermore, since waveform analysis is not necessary, provided are advantages of increasing a speed for determining the vehicle driving state, such as immediately performing determination when a wheel comes in contact with a speed bump and the like, and not requesting information on a speed of non-driving wheels.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising a controller including a memory storing instructions and a processor configured to execute the instructions stored in the memory, wherein, based on that the instructions are executed by the processor, the processor is configured to:

collect vehicle driving information from one or more sensors;

obtain an acceleration error, an acceleration disturbance rate, and an acceleration disturbance of the vehicle based on the vehicle driving information;

determine a driving state of the vehicle at least partially based on the acceleration error, the acceleration disturbance rate, and the acceleration disturbance; and controlling wheel slip of the vehicle based on the driving state.

2. The vehicle of claim 1, wherein the controller is configured to determine whether the wheel slip of the vehicle occurs based on the obtained acceleration error and the obtained acceleration disturbance rate.

3. The vehicle of claim 1, wherein the controller is configured to obtain the acceleration error partially based on a torque, an acceleration, and a speed, and a predetermined equivalent inertia of the vehicle, collected by the one or more sensors.

4. The vehicle of claim 1, wherein the one or more sensors include at least one of an accelerator pedal sensor, a brake pedal sensor, a wheel speed sensor, a vehicle speed sensor, or an acceleration sensor.

5. The vehicle of claim 1, wherein the controller is configured to obtain the acceleration disturbance rate partially based on a rotation speed of a vehicle drive apparatus and a torque of the vehicle, collected by the one or more sensors.

6. The vehicle of claim 5, wherein the controller is configured to obtain the acceleration disturbance based on the acceleration disturbance rate.

7. The vehicle of claim 1, wherein the driving state includes a state where the vehicle passes a height step on a road surface or a state where the vehicle drives on a slope with a gradient.

8. The vehicle of claim 7, wherein the height step is any one of a pothole, a bump, or a depression formed on a road.

9. The vehicle of claim 1, wherein the controller is configured to determine whether the wheel slip occurs, whether the vehicle passes a height step on a road surface, or whether the vehicle drives on a slope with a gradient based on at least part of the acceleration error, the acceleration disturbance rate, and the acceleration disturbance.

10. The vehicle of claim 9, wherein the controller is configured to implement a wheel slip reduction control, in response to determining that the wheel slip has occurred in the vehicle and the vehicle has not passed the height step.

11. The vehicle of claim 9, wherein the controller is configured not to implement a wheel slip reduction control, in response to determining that the wheel slip has not occurred in the vehicle and the vehicle has passed the height step.

12. The vehicle of claim 1, wherein the vehicle comprises an electric vehicle including a motor.

13. A method for controlling wheel slip of a vehicle, the method comprising:

collecting, by a controller, vehicle driving information from one or more sensors;

obtaining, by the controller, an acceleration error, an acceleration disturbance rate, and an acceleration disturbance of the vehicle based on the vehicle driving information;

determining, by the controller, a driving state of the vehicle at least partially based on the acceleration error, the acceleration disturbance rate, and the acceleration disturbance; and controlling, by the controller, wheel slip of the vehicle based on the driving state.

14. The method of claim 13, wherein the determining of the driving state includes:

determining whether the wheel slip of the vehicle occurs based on the obtained acceleration disturbance rate and the obtained acceleration error.

15. The method of claim 13, wherein the driving state includes a state in which the vehicle is driving on a slope with a gradient or a state where the vehicle passes a height step on a road surface.

16. The method of claim 15, wherein the height step is any one of a pothole, a bump, or a depression formed on a road.

17. The method of claim 13, further comprising:

determining, by the controller, whether the wheel slip occurs, whether the vehicle is passing through a height step of a road surface, or whether the vehicle drives on a slope with a gradient based on at least part of the acceleration error, the acceleration disturbance rate, and the acceleration disturbance.

18. The method of claim 17, wherein the controller is configured to implement a wheel slip reduction control, in response to determining that the wheel slip has occurred in the vehicle and the vehicle has not passed the height step.

19. The method of claim 17, wherein the controller is configured not to implement a wheel slip reduction control, in response to determining that the wheel slip has not occurred in the vehicle and the vehicle has passed the height step.

20. The method of claim 13, wherein the one or more sensors include at least one of an accelerator pedal sensor, a brake pedal sensor, a wheel speed sensor, a vehicle speed sensor, or an acceleration sensor.

* * * * *